Patented June 2, 1953

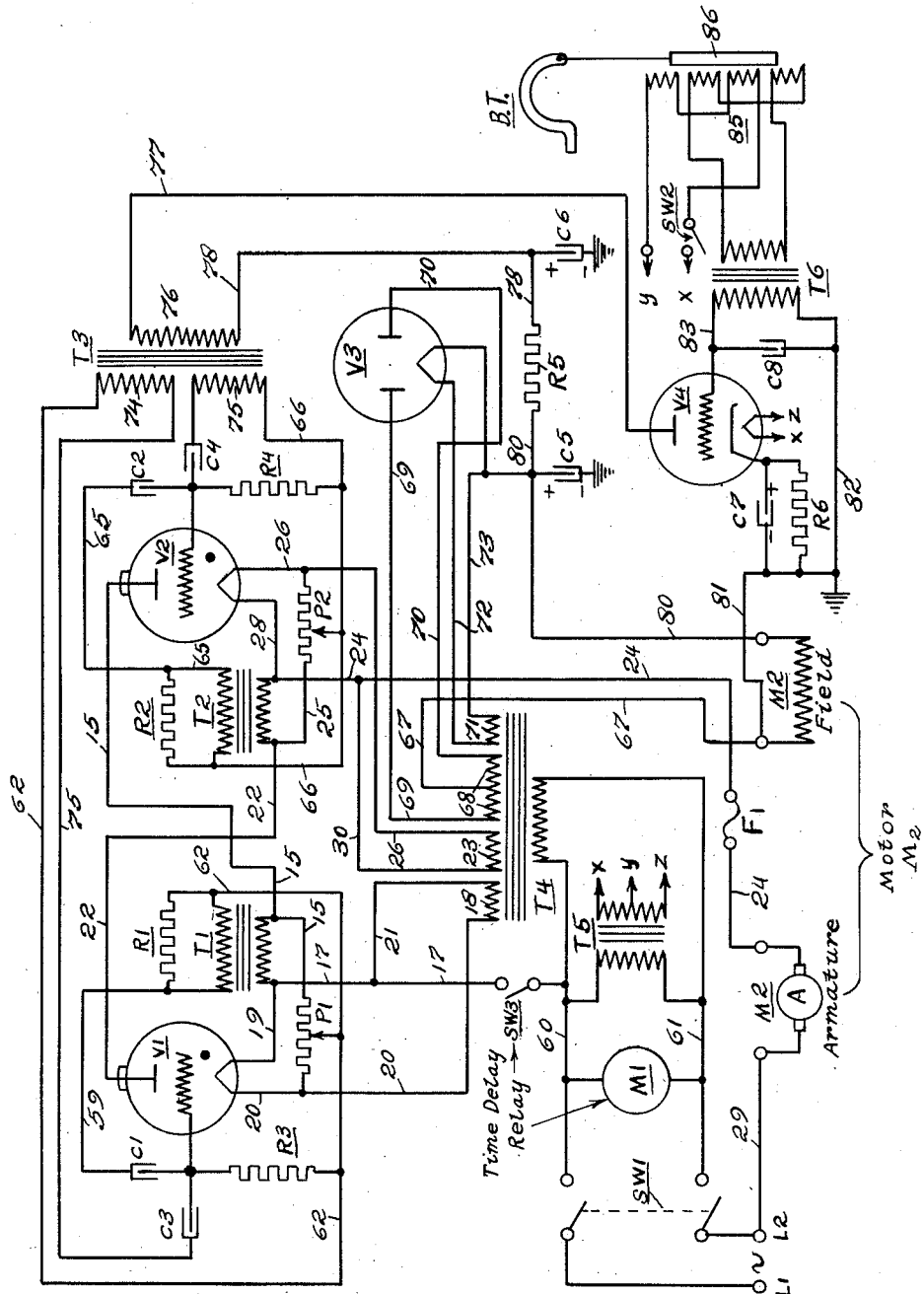

2,640,957

UNITED STATES PATENT OFFICE 2,640,957

CONTROL CIRCUIT FOR REVERSIBLE D. C. MOTORS

William D. Macgeorge, Collegeville, and Charles Cross, Philadelphia, Pa., assignors to Automatic Temperature Control Co., Inc., Philadelphia, Pa., a corporation of Pennsylvania Application April 18, 1950, Serial No. 156,688

2 Claims. (Cl. 318—257)

This invention relates to motor control circuits, and particularly to a control circuit for a reversible D. C. motor.

There are many applications for the use of reversible D. C. motors of moderately large sizes which can be quickly and easily started and stopped, especially in conjunction with a condition-responsive movable element of a movable element transformer controlled by the expenditure of minute forces through minute distances on the movable element of such transformer.

It is among the objects of this invention to improve the art of motor regulation; to provide a circuit incorporating gas-filled tubes for controlling a reversible D. C. motor; to provide a circuit for remotely and reversibly controlling a D. C. motor from the output of a small differential transformer having an armature movable in response to minute forces thereon and also having minute movements relative to the transformer; to provide a circuit incorporating gas-filled tubes for reversely controlling the running of a D. C. motor without the use of relays and contactors normally employed in connection with the use of such tubes; to provide a control circuit for a D. C. motor utilizing pulses, the rate and duration of which are functions of the output of an associated differential transformer; to provide a motor regulating circuit for a reversible D. C. motor insuring high torque in both directions; to provide a D. C. motor regulating system by which gradual speed increase and decrease can be effected on either side of a control point to prevent over-shoot; to provide a D. C. motor control for a reversible D. C. motor free from hunting and with quick stopping; to control a large reversible D. C. motor from the output of a small differential transformer, the movable armature or core of which has a movement of very small magnitude and requires displacement forces of very small magnitude, so as to be directly responsive to changes in the condition of a variable with which it is associated, and which control is effective between running at full speed in one direction, stopping the motor and running at full speed in the other direction, with continuous minute displacement of the transformer armature or core in one direction relative to the transformer; to provide a circuit incorporating two gas tubes, to each of which a small negative grid bias is applied with cross connections between the tubes incorporating lock-out transformers whereby firing of one tube instantaneously increases the bias on the other to prevent simultaneous firing of both tubes and as a guard against firing from stray currents in the circuit; to provide a D. C. motor regulating system in which the motor speed established by a given controlling signal from a transmitter tends to remain constant with variations of the load on the motor; and to provide other objects and advantages which will become more apparent as the description proceeds.

In the accompanying drawing, the figure represents a wiring diagram of the illustrative elements of the motor control system incorporated in a control circuit.

Referring to the wiring diagram, the line L1 and L2 leads through main switch SW-1 to connectors 60 and 61, bridged respectively by: time delay relay M1, controlling switch SW-3 after a predetermined timed interval to insure proper heating of the tubes after closing of main switch SW-1; the primary of a transformer T5, the secondaries of which energize the controlling differential transformer for the system to be described as well as heating the filament of the amplifying tube V4 also to be described; and the primary of the main transformer T4, the secondaries of which respectively furnish the voltages for the gas-filled tubes V1 and V2, as well as supplying the grid bias voltage, heating the cathode and furnishing the plate current for the rectifier tube V3 for energizing the field of the D. C. motor M2. It is the running of motor M2 which is controlled by the circuit here involved.

The tube V1 has its filament connected to one end of the secondary 18 of main transformer T4, by a lead 20, which also is connected to one end of the potentiometer P1. The return of the filament is by wire 19, connected to one end of the primary of what may be deemed a first tube "lock-out" transformer T1, and through connectors 17 and 21 to the other end of the secondary 18. Connector 17 extends to one side of the time-controlled switch SW-3, and through connector 60 to the line L1. The plate of tube V2, through connector 15, leads to the other end of the primary of the first lock-out transformer T1, and to the other end of potentiometer P1. The grid of tube V1 connects through condenser C1 by a connector 59 to one end of the secondary of the first lock-out transformer T1, and to one end of the resistance R1, through these elements which are arranged in parallel, and by a connector 62 past the arm of potentiometer P1, through resistance R3, back to the grid of tube V1. Connector 62, extending from the lower end of the resistance R3, runs to one end of a secondary 14 of a final signalling transformer T3, and the other end of secondary 74 connects through connector 75 and condenser C3 to the grid of the tube V1.

The plate of tube V1, through connector 22 leads to one end of the primary of a second lock-out transformer T2, and the other end of which leads to the filament of tube V2 through connector 28, and also through a connector 24, to one side of the armature A of the D. C. motor M2. The other side of the armature A, through lead 29, connects with the line L2. The filament of tube V2 is connected to one end of the secondary 23 of the transformer T4, by the connectors 24, 28, and 30. The plate of tube V1 as noted is connected through connector 22 to one side of the primary of the second lock-out transformer T2 and also through connector 25 to one end of the potentiometer P2. The other end of this potentiometer and the other end of the filament of this tube, through connector 26 leads to the other end of the secondary 23 of main transformer T4. The grid of tube V2, through condenser C2, leads by connector 65 to one end of resistance R2 and also to one end of the secondary of lock-out transformer T2. The latter elements are in parallel and are joined at their other ends by connector 66 to the arm of potentiometer P2, and to the lower end of resistance R4, the upper end of which connects to the grid. Connector 66 on the other side of the resistance R4 connects with one end of the secondary 75 of final signalling transformer T3. The other end of the said secondary connects through a condenser C4 to the grid.

The field of the motor M2 has one connector 67 leading to a center tap of the secondary 68 of the main transformer T4, the opposite respective ends of which, by leads 69 and 70, connect with the respective plates of the rectifier tube V3. The filament of tube V3 is heated by the secondary 71 of the main transformer T4 through connectors 72 and 73. The primary 76 of final signal transformer T3 is joined by connector 77 to the plate of amplifying tube V4, at one end thereof, and the other end thereof by connector 78 leads to one end of a resistance R5, and the other end of this resistance, by connector 80, leads to the other side of the field of motor M2. The lead connectors 78 and 80 are capacitively grounded through condensers C6 and C5 on the ends of the resistance R5. The filament of the amplifying tube V4 is heated by leads X and Z from the secondary of transformer T5, and the cathode thereof through condenser C7 and resistance R6, in parallel, joins by a connector 81 to the first mentioned end of the motor field to the same terminal as lead 67 thereto. The connector 81, through grounded connector 82, leads to one end of main phasing condenser C8 and one end of the secondary of initial signalling transformer T6, in parallel, and these are both connected at their other ends by connector 83 to the grid of the tube V4.

The transmitter element 85 of the circuit comprises a movable element transformer, and preferably a differential transformer according to the teachings of application Serial Number 61,835, filed by William D. Macgeorge, one of the joint applicants herein, on November 24, 1948. This has now matured into Patent No. 2,568,587, dated September 18, 1951. According to this form of differential transformer, two hollow air core coils are provided, each coil of which comprises a plurality of wires of identical turns laid on in mutual adjacency, which are so interconnected as to furnish a primary and a secondary, with the latter having two output leads, the A. C. flow through which is respectively of opposite phase one to the other when the primary is energized by a suitable A. C. source so that the output is of the phase of the output of greater amplitude. Of course, any sort of differential transformer can be used. In the wiring diagram the primaries of the illustrative differential transformer are coupled in aiding series relation and energized from the leads X and Y of the transformer T5, controlled by switch SW-2. The secondaries thereof are in series bucking relation, and the secondary output connections lead to the respective ends of the primary of initial signalling transformer T6. The transmitter differential transformer 85 is provided with an axially movable armature or core 86, disposed for operation by any condition-responsive device B. T. coupled to and displacing the armature in accordance with a selected variable. With the small mass of the armature in mind, it will be seen that the load on the variable is very slight, as the mass is displaceable by a force so small as to be measured in a few hundredths of a gram. This is very important when considering the size of the D. C. motor which can be controlled by the transformer, which may equal or exceed one horse power. There are two important functions involved. One is minute force for displacements of the armature when this is of importance, and the other is the extremely small motion necessary to swing the output of the differential transformer 85 from a maximum amplitude of one phase with one sense of armature core displacement, through a substantially null output from the transformer, to a maximum amplitude of the opposite phase with the other sense of armature core displacement. Of course, by predetermination of turn ratios, etc. the range of armature core displacements can be increased or decreased, as desired. Purely illustratively, this can be accomplished by an armature core displacement as small as well within $\frac{1}{64}$ inch. If the variable is pressure, and the device is a pressure-responsive device such as a Bourdon tube B. T. shown, it will be noted that no appreciable load is imposed on such tube by either the armature core mass, electrical force from the transformer stator, or by the force required to adjust the armature mass.

In operation the line switch SW-1 is closed, completing the line circuit through leads 60 and 61 and starting the time delay relay motor M1, energizing the primaries of transformers T4 and T5, thus heating the filaments or cathodes of tubes V1, V2, V3, and V4.

It is usually better to balance the gas tubes alone, for which purpose switch SW-2 is temporarily left open. To this end, after an interval for warming the tubes, switch SW-3 is automatically closed. Then the potentiometer arms of P1 and P2 are adjusted so that the impressed or applied negative bias on the grids is such that tubes V1 and V2 will just not fire. This is a small value and is quite critical. After the grid bias has been established and found to be correct within the critical limits of the tubes and the circuit, switch SW-2 is closed. The transmitting transformer 85 is then adjusted so that the tubes V1 and V2 do not fire when the variable is at datum condition. If the armature 86 of transformer 85 is substantially centered so that the output is substantially null, no signal is developed in the primary of initial signalling transformer T6 so that no signal is developed in either secondary 74 or 75 of final signalling transformer T3, and the motor remains braked by the energization of its field only, by the impressed D. C. from the tube V3.

Assume now a small relative motion of the armature 86 in one sense in response to a change of related sense in the variable, which displaces the variable-responsive element coupled to the armature 86. There will then be a transmitter output of small amplitude of a phase related to the sense of armature core movement from the transformer 85, which energizes the primary of initial signalling transformer T6. The A. C. voltage from the secondary thereof is amplified by tube V4 and impressed on the primary of final signalling transformer T3. The secondaries 74 and 75 of final signalling transformer T3 then transfer the A. C. signal to the respective grids of the tubes V1 and V2. Owing to the arrangement of the leads from the transformer secondaries 74 and 75, however, it will be seen that with one phase relation in the primary 76 relative to the phase of the grid bias, the output from the respective secondaries impresses an effectively plus voltage on the grid of one tube V1 or V2, while simultaneously an effectively negative voltage pulse is applied to the grid of the other tube of the tubes V1 and V2. The tube which is thus energized positively on the grid fires and discharges a pulse or series of pulses through the plate and into the plate circuit. Let it be assumed to be the plate of tube V1.

The motor controlling circuit through tube V1 is then through the armature A of the motor in the following circuit, from the line L1, connector 60, switch SW-3, the connector 17, through the filament of the tube to the plate of V1, then through plate connector 22, through the primary of the second lock-out transformer T2, connector 24, through the motor armature A, through connector 29, to L2.

Assuming that it is tube V2 upon the grid of which the instantaneously positive pulses are placed, the circuit through the motor armature A is from line L2, connector 29, armature A, connector 24, fuse F1, filament of tube V2 to the plate, from the plate through connector 15, through the primary of the first lock-out transformer T1, connector 17, switch SW-3, connector 60 to line L1.

The important functions of the lock-out transformers T1 and T2 will now be apparent, because the pulse circuit from the plate of one of the gas-filled tubes, instantaneously impresses a negative pulse on the grid of the opposite tube, increasing the negative bias already placed thereon to prevent the tube so biased from firing. This prevents both tubes from firing at the same instant, and insures that only D. C. pulses of the proper polarity are applied to the armature A. These tube pulses are proportionate in duration to the displacement of the armature core 86 of the transmitter transformer 85 and in rate to the load on the armature as it modifies back E. M. F. from the field. The lock-out transformers are effective to block out or damp any stray currents passing through the system. The presence of a load on the armature smooths out the pulses, and reduces the back E. M. F. so that the pulses secure angular motion by rotating the armature.

The functioning of the system utilizes in its speed control the effective shifting phase of the resultant voltage on the grids of the gas tubes V1 and V2, formed by the relation of the phase of the established grid bias, as varyingly modified by the transmitter signal. Assume a sine wave of the grid bias, illustratively, substantially 180° out of phase with the plate voltage, and a signal voltage approximately 90° out of phase with both. It will be seen that during the intervals both the plate and the resultant grid voltages are effectively positive simultaneously there will be a power pulse transmitted, and the width or duration of the pulse, representing power input to the armature of the motor, will vary in accordance with the amplitude of the signal voltage. That is, with weak signal voltage the resultant voltage on the grid shifts with relation to the plate voltage phase so that the pulse is narrow and weak, and progressively increases in duration or width as the amplitude of the amplified signal from the transmitter increases. The crest of the positive phase of the resultant grid voltage shifts relative to the phase of the plate voltage with transmitter amplitude changes and therefore changes the output of the tubes as to duration of each pulse.

While for a given input of transmitter signal of given amplitude there are pulses with every alternation of the plate voltage, it will be understood that with no load on the armature the first pulse develops a back or counter E. M. F. in the system of such amplitude as to prevent the next pulse or next few pulses from being effective on the armature. That is, until the back E. M. F. decays sufficiently to permit transmission of a succeeding pulse. This reduces the rate of pulse production from the maximum available from the impressed signal on the firing tube. However, with the application of load to the motor armature the back E. M. F. is reduced and the pulse rate attains the maximum determined by the cycles of the line voltage. With the rate thus established, and the duration and power established by the amplitude of the transmitter signal, the speed of the motor M2 is closely and accurately controlled.

At maximum transmitter amplitude the given tube is discharging at maximum capacity and the motor speeds increase proportionately to the increase in amplitude of the controlling signal. On the other hand, as the amplitude of the signal of given phase from the controlling differential transformer decreases, for instance with recovery of part of the change of variable causing the initial unbalance, if, as is contemplated, the motor M2 controls the variable, the motor speed is proportionately reduced, until, with attainment of a substantially null output from the transmitting or controlling transformer, both tubes are biased against firing and the motor comes to a prompt braked stop. It is clear that if the variable overshoots and departs from the datum condition in the other sense, the other tube of the tubes V1 and V2 fires and starts the motor running in the other direction.

It will be seen therefore that with the circuit disclosed minute axial movements of the transmitting armature requiring minute forces for the motion are effective to run a moderately large D. C. motor, at least as large as a one or two horsepower motor, without relays, contactors, or other related parts, to run it in either direction and to bring it to a complete stop with attainment of a datum condition of the associated variable. It will be understood that any other sort of transmitter may be used, and it does not need to be responsive to a variable. Many changes may be made in the illustrative circuit without departing from the spirit and principles of the invention and such are to be considered as within the scope of the invention.

Having thus described our invention, we claim:

1. A D. C. motor regulating circuit comprising an electrical network, a D. C. motor having a field and an armature, circuit means in the network for energizing said field with D. C., a first and a second multi-element gas tube in the network, a first and a second line connection in the network supplying A. C. plate voltage of given phase to the respective tubes, one of said connections passing through said armature, circuit means in the network including a potentiometer for energizing the grid-cathode circuit of each of the respective tubes for heating the cathode and applying a variable A. C. grid bias to the respective tubes controlled by the respective potentiometers with the same phase as the plate voltage, signalling means in the network including a differential transformer comprising a hollow air-cored stator and a relatively movable core armature of variable axial positioning in the stator, said stator comprising a primary and secondaries so organized that the secondaries output is substantially null in one generally symmetrical disposition of the core armature in the stator with substantially no electrical pull therebetween, said differential transformer having an output of linearly increasing amplitude in both senses of relative departure of the core armature from its said substantially symmetrical position in the stator with signals of one or the opposite phase according to the sense of departure and with a phase predeterminedly out of phase with that of the A. C. grid bias, to maximum amplitudes thereof substantially without electrical pull between the stator and core armature, said signalling means impressing the differential transformer output signals in opposite senses simultaneously on the grids of the respective tubes whereby the bias of one tube is augmented and that of the other is modified to cause said other tube to fire to run said motor in the proper sense and at a speed functional with the sense and amplitude of differential transformer output.

2. A D. C. motor regulating circuit as recited in claim 1, in which a primary of a first transformer is in the first line connection and the secondary thereof is connected to the grid of the second tube, and in which a primary of a second transformer is in the second line connection and the secondary thereof is connected to the grid of the first tube, whereby the firing of one tube increases the bias on the grid of the other tube to preclude simultaneous fire of both tubes.

WILLIAM D. MACGEORGE.
CHARLES CROSS.

References Cited in the file of this patent

UNITED STATES PATENTS

| Number | Name | Date |
|---|---|---|
| 1,967,877 | Fecker | July 24, 1934 |
| 2,175,009 | Anderson | Oct. 3, 1939 |
| 2,293,502 | Hermann | Aug. 18, 1942 |
| 2,333,393 | Ryder | Nov. 2, 1943 |
| 2,420,539 | Hornfeck | May 13, 1947 |
| 2,432,422 | Hornfeck | Dec. 9, 1947 |
| 2,437,140 | Waldie | Mar. 2, 1948 |
| 2,452,609 | Somers et al. | Nov. 2, 1948 |
| 2,493,575 | Edwards | Jan. 3, 1950 |

FOREIGN PATENTS

| Number | Country | Date |
|---|---|---|
| 446,848 | Great Britain | May 7, 1936 |